(12) United States Patent
Gill

(10) Patent No.: US 7,761,664 B2
(45) Date of Patent: Jul. 20, 2010

(54) SYSTEMS AND METHODS FOR MULTI-LEVEL EXCLUSIVE CACHING USING HINTS

(75) Inventor: Binny S. Gill, Auburn, MA (US)

(73) Assignee: International Business Machines Corporation, Armonk, NY (US)

( * ) Notice: Subject to any disclaimer, the term of this patent is extended or adjusted under 35 U.S.C. 154(b) by 545 days.

(21) Appl. No.: 11/735,187

(22) Filed: Apr. 13, 2007

(65) Prior Publication Data

US 2008/0256294 A1 Oct. 16, 2008

(51) Int. Cl.
*G06F 12/08* (2006.01)
(52) U.S. Cl. .................. 711/119; 711/122; 711/136
(58) Field of Classification Search ............... None
See application file for complete search history.

(56) References Cited

U.S. PATENT DOCUMENTS

| | | | |
|---|---|---|---|
| 5,564,035 A | 10/1996 | Lai | |
| 5,715,428 A | 2/1998 | Wang et al. | |
| 5,900,015 A | 5/1999 | Herger et al. | |
| 6,223,256 B1 * | 4/2001 | Gaither | 711/134 |
| 6,378,048 B1 | 4/2002 | Prudvi et al. | |
| 6,385,695 B1 * | 5/2002 | Arimilli et al. | 711/122 |
| 6,385,702 B1 | 5/2002 | Arimilli et al. | |
| 6,851,024 B1 | 2/2005 | Wilkes et al. | |
| 7,007,135 B2 * | 2/2006 | Koo et al. | 711/122 |
| 2005/0138292 A1 | 6/2005 | Sullivan | |
| 2006/0230235 A1 * | 10/2006 | O'Connor et al. | 711/133 |
| 2007/0124560 A1 * | 5/2007 | van Riel | 711/216 |

OTHER PUBLICATIONS

Brenza et al., 'Multi-level Cache System for MP.'; Aug. 1991; IBM Technical Disclosure Bulletin; pp. 256-258.
Pomerene et al., 'Avoiding XI in Mp Systems Using Software Locks'; Dec. 1989; IBM Technical Disclosure Bulletinl pp. 299-301.
Ou et al., 'A Unified Multiple-Level Cache for High Performance Storage Systems'; Proceedings of the 13th IEEE International Symposium on Modeling, Analysis, and Simulation of Computer and Telecommunication Systems (MASCOTS'05).

* cited by examiner

*Primary Examiner*—Than Nguyen
(74) *Attorney, Agent, or Firm*—Cantor Colburn LLP; Van Nguy

(57) ABSTRACT

Systems and methods for multi-level exclusive caching using hints. Exemplary embodiments include a method for multi-level exclusive caching, the method including identifying a cache management protocol within a multi-level cache hierarchy having a plurality of caches, defining a hint protocol within the multi-level cache hierarchy, identifying deciding caches and non-deciding caches within the multi-level cache hierarchy and implementing the hint protocol in conjunction with the cache management protocol to decide which pages within the multi-level cache to retain and where to store the pages.

13 Claims, 6 Drawing Sheets

SYSTEMS AND METHODS FOR MULTI-LEVEL EXCLUSIVE CACHING USING HINTS

TRADEMARKS

IBM® is a registered trademark of International Business Machines Corporation, Armonk, N.Y. U.S.A. Other names used herein may be registered trademarks, trademarks or product names of International Business Machines Corporation or other companies.

BACKGROUND OF THE INVENTION

1. Field of the Invention

This invention relates to computer systems, and particularly to systems and methods for multi-level exclusive caching using hints.

2. Description of Background

Caching can be used to hide the long latency of access to slower but relatively cheaper non-volatile storage, such as hard drives. Today, access to stored data is organized in a hierarchical fashion, with each layer provided with its own cache. For example, a particular software application may request data from a hard drive. However, the data may have to pass through multi-levels of caches until the data reaches the application. Most of the time, the caches in multiple levels are operationally unaware of the other caches in the hierarchy and thereby forgo the performance benefits that can be achieved by mutual collaboration between the multiple levels of caches.

As an illustration, a client-server configuration can include a storage server cache, a database server cache and a client cache. Both servers can each include cache management schemes that are independent and different from each other. In most cases, such independent cache management schemes result in lower levels of cache housing data elements that the higher levels (closer to the clients) already house. Such common elements are typically never accessed from the lower level as long as the higher level keeps a copy of the elements, and thus occupy cache space uselessly. In general, the more overlap in multiple caches, the more wasted cache space that results. The problem of overlapping caches is generally referred to the problem of inclusion. In addition, a miss from two caches, for example, costs at least an order of magnitude more than a hit in either of the levels individually because the access to the disks is extremely slow compared to network delays and memory accesses.

One example of a common read cache management algorithm is the Least Recently Used (LRU) replacement algorithm. This cache management algorithm works well in the scenario of a single level of read cache. However, in cases where there are more than one level of non-trivial amount of cache then the LRU algorithm can be wasteful. For example, for a two-level read cache scenario in which both levels have a cache of size 's', the level closer to the client leverages temporal locality and provides cache hits as is expected from the LRU algorithm. The lower level of the two levels, however, typically has a very low amount of hits, as most of its contents are duplicates of data already present in the higher level. Thus, the lower level of cache performs sub-optimally. Caches are a very expensive component of today's servers and it is critical to avoid such wastage whenever it is possible. It is desirable to increase the aggregate hit ratio in the caches, as a hit in any cache is considerably fast as compared to disk response times, thereby reducing the average response time. In addition, it is desirable to increase the hit ratio in a higher-level cache, as a hit on a higher level is faster than a hit on a lower level, thereby decreasing the average response time.

BRIEF SUMMARY

Exemplary embodiments include a method for multi-level exclusive caching, the method including identifying a cache management protocol within a multi-level cache hierarchy having a plurality of caches, defining a hint protocol within the multi-level cache hierarchy, identifying deciding caches and non-deciding caches within the multi-level cache hierarchy and implementing the hint protocol in conjunction with the cache management protocol to decide which pages within the multi-level cache to retain and where to store the pages.

Additional embodiments include a method for managing pages in a multi-level exclusive caching system, the method including determining a probability that a page in a lower level cache is promoted to a higher level cache and adjusting the probability in response to page traffic of the lower level and higher level caches.

Further embodiments include a computer-readable medium having computer-executable instructions for performing a method, including determining a probability that a page in a lower level cache is promoted to a higher level cache within a multi-level exclusive caching environment, increasing the probability of promoting the page to a higher cache in response to a higher life expectancy of the page in the higher cache (the expectancy of a page is the time it is expected to be retained in the cache before it is removed to make room for a new page), decreasing the probability of promoting the page to a higher cache in response to the lower life expectancy of the page in the higher cache, increasing the probability of promoting the page to a higher cache in response to an increased hit rate of the page in the lower level cache and decreasing the probability of promoting the page to a higher cache in response to a decreased hit rate of the page in the lower level cache.

Further embodiments include a system for multi-level exclusive caching, the system including a lower level cache, a higher level cache, a exclusive caching process for providing cache management of the lower and higher level caches, the process including instructions to implement a cache management protocol within a multi-level cache hierarchy to determine the passage of pages between the caches, implement a hint protocol within the multi-level cache hierarchy, identify deciding caches and non-deciding caches within the multi-level cache hierarchy, implement the hint protocol in conjunction with the cache management protocol to decide which pages within the multi-level cache to retain and where to store the pages and determine a probability that a page in a lower level cache is promoted to a higher level cache within a multi-level exclusive caching environment.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

TECHNICAL EFFECTS

As a result of the summarized invention, technically systems and methods have been achieved which equalize traffic into and out of caches or the marginal utility of the caches in a multi-cache exclusive hierarchy by dynamically adjusting probabilities of the promotion of pages in each of the caches. The passage of hints sent along with read requests and responses are implemented to adjust the probabilities. The hints include indications of life expectancies of pages in the caches and hit rates of pages in the caches.

BRIEF DESCRIPTION OF THE DRAWINGS

The subject matter which is regarded as the invention is particularly pointed out and distinctly claimed in the claims at the conclusion, of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

Exemplary embodiments include systems and methods that implement hints passed between caches in a multi-level cache hierarchy to promote pages most commonly accessed to higher level caches, and eliminating duplicate pages in lower level, caches, thereby increasing the efficiency of page storage in the multi-level cache environment. Probabilities of promoting pages from a lower level cache to a higher-level cache are calculated for each cache in the multi-level cache hierarchy. The probabilities are adjusted based on the passage of hints, which can include a life hint and a marginal hit rate hint. Based on the probabilities, adjusted accordingly based on life hints and marginal hit rate hints, when read requests and read responses are made between the caches, a hint is also passed indicating that the cache either keeps or promotes the requested page. As such, a multi-level cache hierarchy having multiple independent caches functions as a single cache with the aggregate size of all the caches. As a result, the marginal utility of the individual caches can be equalized, the multi-level cache behaves like an exclusive cache at all levels, and most commonly accessed pages are promoted to higher level caches leaving lower level caches free to receive other pages without having duplicates of the pages that have been promoted to the higher level caches.

In exemplary implementations, the systems and methods described here operate with existing cache read management algorithms. For example, the LRU algorithm can be implemented with the systems and methods described herein. However, it is understood that in other exemplary embodiments and implementations other cache read management algorithms such as but not limited to: LRU-k, Least Frequently Recently Used (LFRU), Multi-Queue (MQ) algorithm. Adaptive Replacement Cache (ARC), Least Frequently Used (LFU), Frequency Based Replacement (FBR), etc., can be used.

In general, the term "page" is used herein to refer to a piece of data or a value residing in a cache for which an application is seeking via a memory reference. When a memory reference finds a value that it is seeking in the cache, the event is called a "hit". If a reference fails to find a sought-after value in the cache, the event is called a miss. When a miss occurs, most memory systems automatically go to successively lower levels of the hierarchy to try to find the desired value. The hit ratio is an important measure of the performance of a memory level and is the probability that a reference is to a value already in a given level of the hierarchy. A hint is an indication from one cache to another of how the cache intends to use a page, thus allowing caches in the hierarchy to respond to the intended use.

Figure 1:
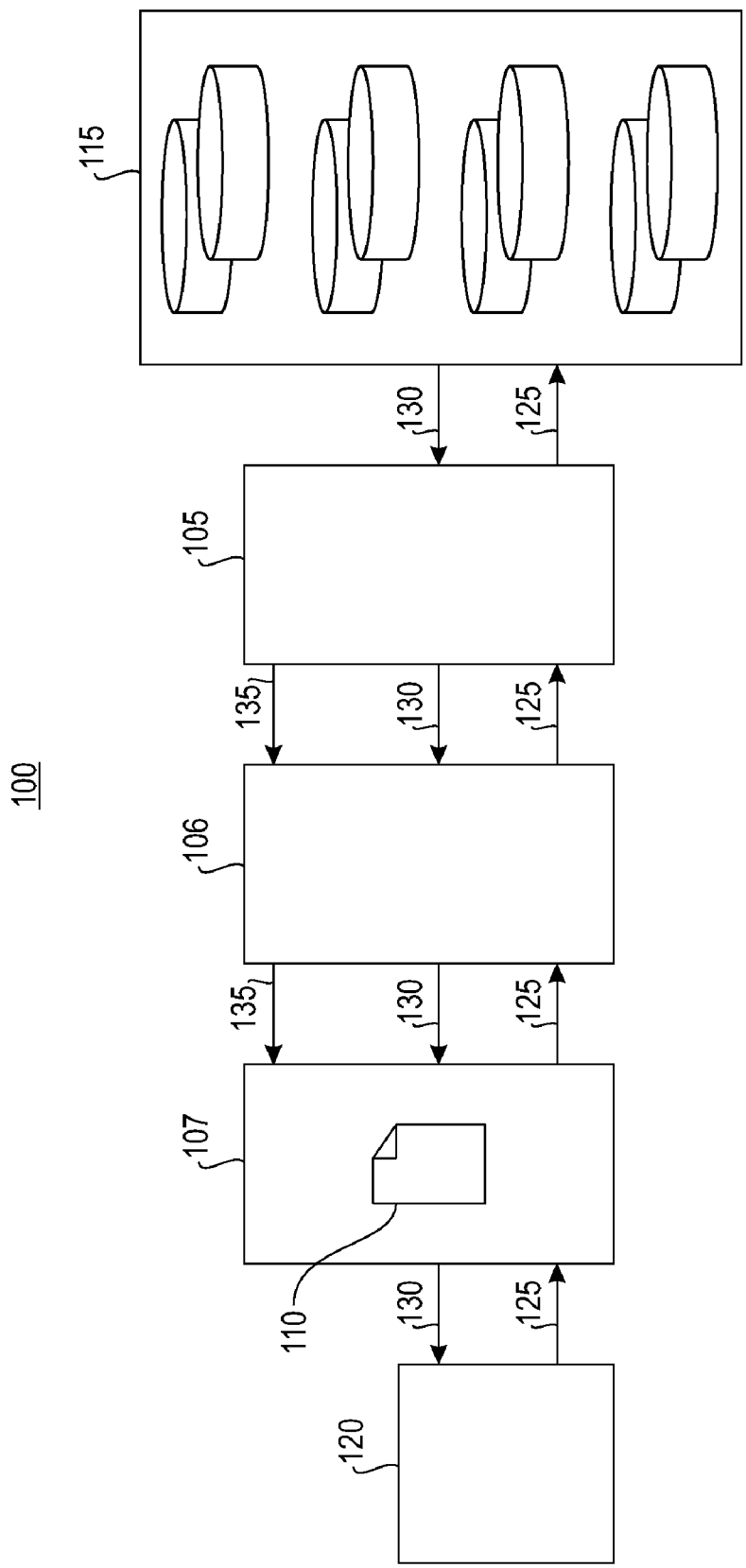
FIG. 1 illustrates a system diagram of a multi-level caching environment in accordance with exemplary embodiments.

Turning now to the drawings in greater detail FIG. 1 illustrates a system diagram of a multi-level caching environment 100 in accordance with exemplary embodiments. The environment 100 includes a number of caches 105, 106, 107, three of which are shown for illustrative purposes. It is appreciated that in other exemplary embodiments and implementations fewer or more caches can be present in the environment 100. The caches 105, 106, 107 are disposed between and in communication with a storage media 115 and an application 120, which can be any variety of client applications. In exemplary embodiments, a number of read requests 125 are exchanged among the caches 105, 106, 107 and between the caches 105, 106, 107, and the storage media 115 and application 120. Furthermore, the application 120 requested one or more pages such as page 110 from the storage media 115. According to exemplary embodiments, hints 135 can be passed between the caches 105, 106, 107 so that the page 110 is promoted from the lower level caches 105, 106 to the higher level cache 107. It is appreciated that the cache 107 is the highest-level cache in environment 100 because it resides closest to the application 120. The methods discussed herein describe the promotion of the page 110 through the multi-level exclusive caching environment 100.

Figure 2:
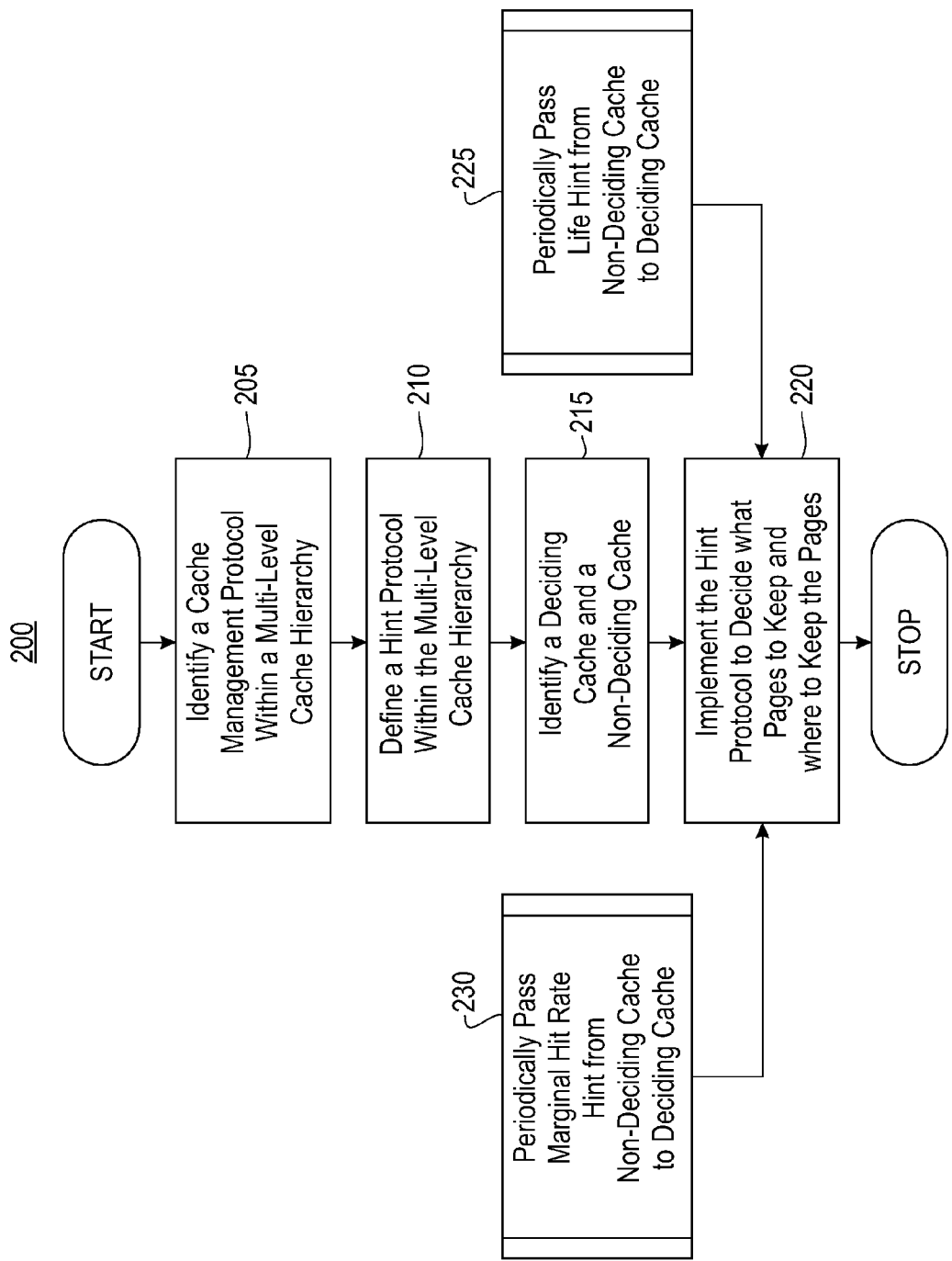
FIG. 2 illustrates a flow diagram of an exclusive cache management method in accordance with exemplary embodiments.

According to exemplary embodiments, a multi-level cache management method can be prepared and implemented in the environment 100 such that the page 110 can be promoted as discussed. FIG. 2 illustrates a flow diagram of an exclusive cache management method 200 in accordance with exemplary embodiments. In order to prepare the environment 100 to make caching decisions to achieve exclusivity, traffic equalization and promotion of cache pages, a cache management protocol is identified at step 205. In one exemplary implementation, the LRU protocol can be identified as the cache management protocol. At step 210, a hint protocol is defined. Exemplary hints include an indication that a particular cache retains or promotes a page within the cache. Other hints can include the life hints and the marginal hit rate hints as mentioned above and discussed in further detail in the description below. At step 215, deciding caches and non-deciding caches are identified. According to exemplary embodiments, a deciding cache is a cache that decides which page is to be cached at which level. A non-deciding cache is a cache that receives hints about whether it should keep the page in its cache or not and obeys the hints. At step 220, the hint protocol is implemented in the environment 100 to determine which pages are kept and which pages are passed to other caches. As discussed further in the description below, a probability of a page being retained in a particular cache is determined during the implementation of the hint protocol.

Periodically, a life hint is passed between a non-deciding cache to a deciding cache at step 225 to adjust the probability. Similarly, at step 230 a marginal hit rate hint is passed between a non-deciding cache to a deciding cache to adjust the probability.

Figure 3:
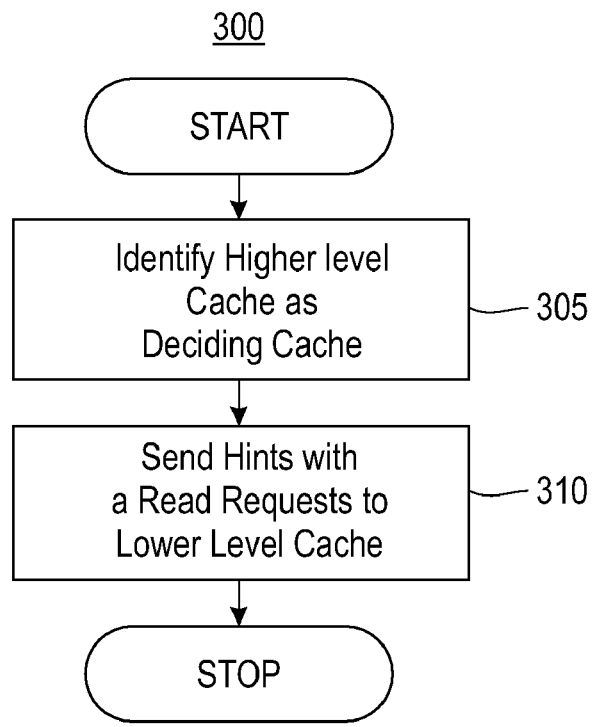
FIG. 3 illustrates a flow diagram a hint protocol definition method in accordance with exemplary embodiments.

According to exemplary embodiments, the passage of hints is handled, differently depending on whether an upper or lower level cache is a deciding or non-deciding cache, and hints are sent along with read requests. In a first exemplary embodiment, an upper level cache can be identified as a deciding cache. FIG. 3 illustrates a flow diagram a hint protocol definition method 300 in accordance with exemplary embodiments. At step 305, an upper level cache is identified as a deciding cache. At step 310, the deciding cache thus sends hints with read requests. When a higher level cache is identified as a deciding cache at step 305, and the higher level cache decides that it will keep a 'missed' element in its cache, it sends an 'I Keep' hint along with a read request to lower level caches at step 310. The lower level of cache then fetches the page from the underlying storage or from its own cache and after returning it to the higher-level cache evicts its copy. Furthermore, when the higher-level cache decides that it will not keep a 'missed' element in its cache, it sends a 'U Keep' hint along with the read request to the lower level cache at step 310. The lower level of cache then fetches the page from the underlying storage or from its own cache and alter returning it to the higher-level cache makes sure that it has a copy of the returned element in its cache.

Figure 4:
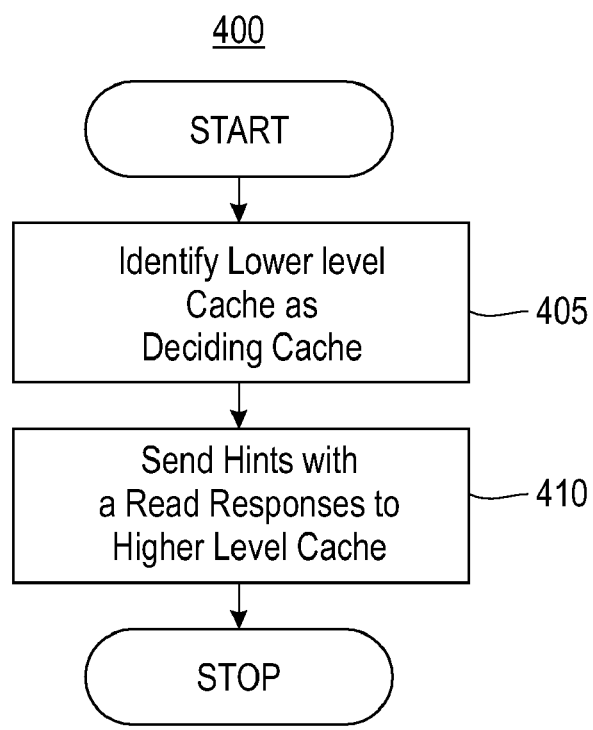
FIG. 4 illustrates a flow diagram a hint protocol definition method in accordance with exemplary embodiments.

In another exemplary embodiment, a lower level, cache can be identified as a deciding cache, and hints are sent along with read responses. FIG. 4 illustrates a flow diagram a hint protocol definition method 400 in accordance with exemplary embodiments. Thus at step 405, a lower level cache is identified as a deciding cache. At step 410, when the response to a read request is to be returned to the higher level cache, the hint of either 'I keep' or 'U keep' can be passed and the higher level obeys the hints.

According to exemplary embodiments, a decision of what pages to keep and what pages not to keep can be made based, on a variety of factors including various hints. As discussed above, the cache that decides which page should be kept in which layer can base its decisions on many algorithms, some of which have better performance in general than the others. As such, performance can be based on techniques including, but not limited to partitioning storage address space, implementing a fixed, hashing function, etc. Considering the first technique, the storage address space can be partitioned into two pieces. All elements that are cached due to access to the first piece are caches by the higher-level cache and the elements in the second piece by the lower level cache. Considering the second technique, a fixed hashing function can be used to decide on a fixed granularity about which elements should be cached at what level. The partitioning of the address space in the above two techniques can be done in a way that the allocated cache size is in proportion to the backend storage address space it supports.

According to exemplary embodiments, to improve the performance of the above-described techniques, a life hint can be passed periodically from the non-deciding cache to the deciding cache. In an exemplary implementation, the life hint can be passed with a long period (e.g., once in every 1000 read requests) and can be piggybacked on read misses or can be passed by itself. The life hint contains the average life of pages in the cache ("Life" is the average amount of time elements spend in a cache before being evicted).

Figure 5:
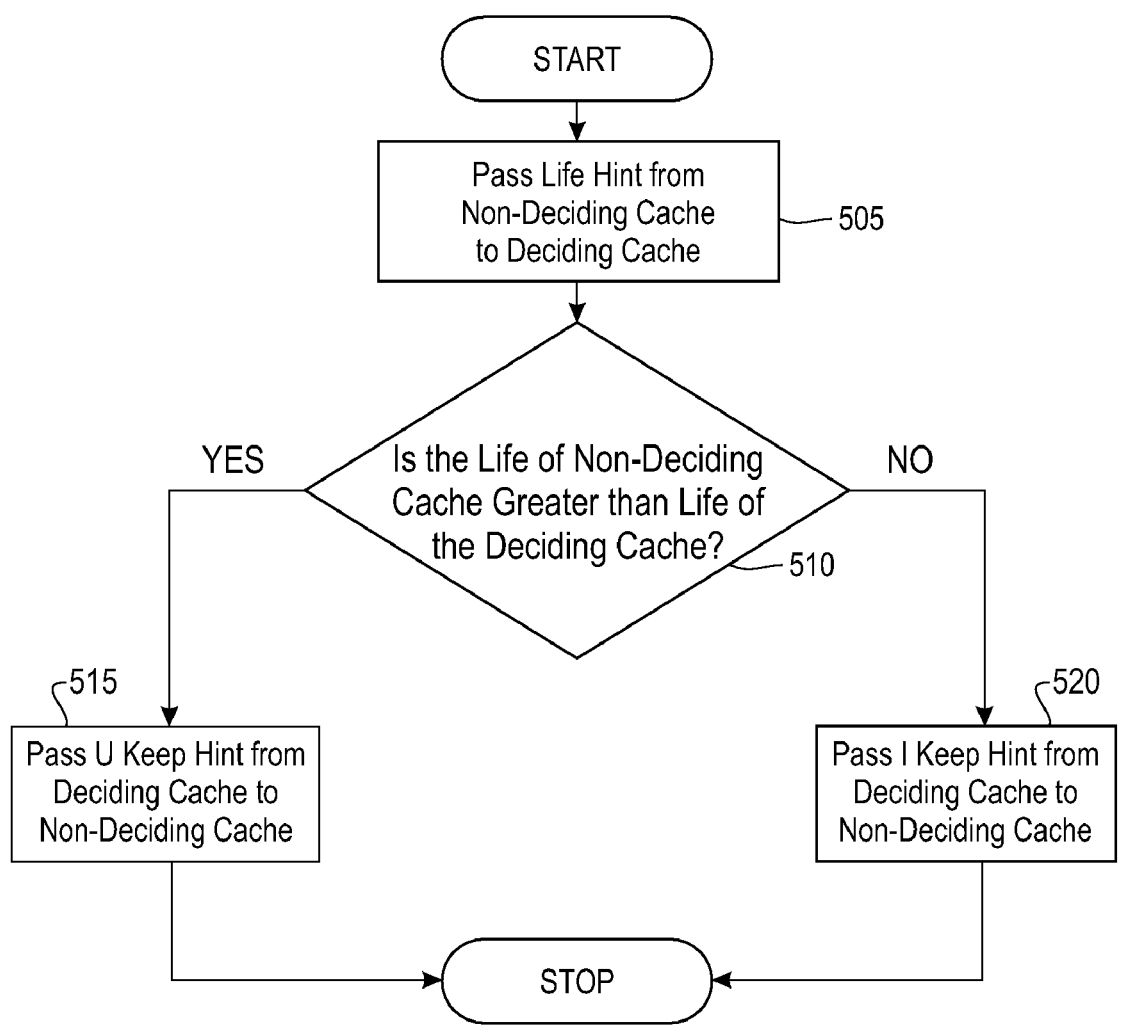
FIG. 5 illustrates a flow diagram of a life hint protocol method in accordance with exemplary embodiments.

FIG. 5 illustrates a flow diagram of a life hint protocol method 500 in accordance with exemplary embodiments. At step 505, life hints are passed from the non-deciding cache to the deciding cache. At step 510, the method 500 determines whether the life of the non-deciding cache is greater than the life of the deciding cache. If the life of the non-deciding cache is greater than the deciding cache at step 510, then at step 515, a 'U keep' hint is passed from the deciding cache to the non-deciding cache. If the life of the non-deciding cache is not greater than the deciding cache at step 510, then at step 520, an 'I keep' hint, is passed from the deciding cache to the non-deciding cache.

In exemplary embodiment, life hints can be leveraged. As such, the life hints can be used to equalize the life in all caches. By equalizing the life of the caches, the read, cache hierarchy can effectively operate as a single cache. For example, if life equalization is ensured, an effective LRU with the aggregate size of the two caches can be attained. Since the deciding cache has the information about the life values of both the caches, it can dynamically balance the two. Whenever the life of the other cache is more than that of the deciding cache, it sends more 'U Keep' hints to the other cache. This passage of increased 'U keep' hints increases the traffic to the other cache, decreasing its life while decreasing the demand on the deciding cache, thereby, increasing its life. When the life of the other cache is smaller than that of the deciding cache, the deciding cache sends more 'I Keep' hints. As such, the hit ratio of such a multi-level cache is the same as that of a single LRU cache of the aggregate size.

In another exemplary embodiment, the marginal hit rate hint can be passed from the non-deciding cache to the deciding cache. The marginal hit rate quantifies the rate of hits in a fixed small portion of the cache near the LRU end of the cache.

Figure 6:
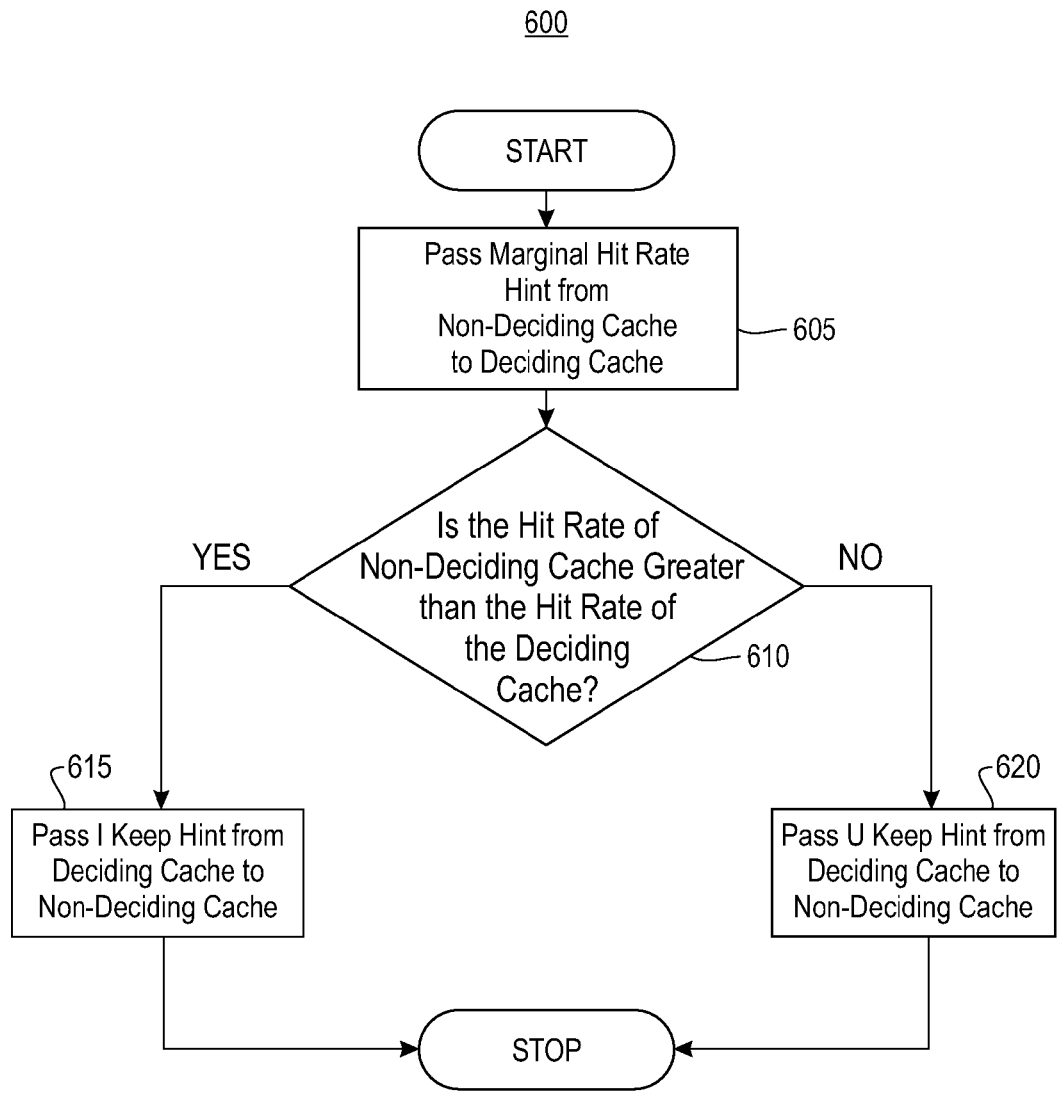
FIG. 6 illustrates a flow diagram of a marginal hit rate hint protocol method in accordance with exemplary embodiments.

FIG. 6 illustrates a flow diagram of a marginal hit rate hint protocol method 600 in accordance with exemplary embodiments. At step 605, marginal hit rate hints are passed from the non-deciding cache to the deciding cache. At step 610, the method 600 determines whether the hit rate of the non-deciding cache is greater than the hit rate of the deciding cache. If the hit rate of the non-deciding cache is greater than the deciding cache at step 610, then at step 615, an 'I keep' hint is passed from the deciding cache to the non-deciding cache. If the hit rate of the non-deciding cache is not greater than the deciding cache at step 610, then at step 620, a 'I keep' hint is passed from the deciding cache to the non-deciding cache. By leveraging the marginal hit rate hint, the deciding cache can strive to equalize the marginal hit rate of both caches in the same way as discussed for the life hint.

The methods described herein can be varied in exemplary embodiments and implementations. For example, in a 'normal' variation, the location where a page is cached is decided only when, the page is 'missed' on both the higher and lower level caches (i.e., the page comes directly from the disk). In a case in which the pages hit on either level, the page stays in that level and follows the local cache algorithm in that level.

In a "smart" variation, pages can move from the lower level to the higher level in the case of a hit on the lower level. In an example in which the lower level is the deciding cache and the "smart" version of the algorithm is implemented, a 'U keep' hint is passed to the higher level in the case of a hit and deletes the page from its own cache. In an exemplary implementation, the life and marginal hit rate of both caches are still determined. Thus, if the 'smart' variation is not allowing the life or marginal utility to be equalized, then the deciding cache can disabled the smart algorithm for a time period.

In an example in which the higher level is the deciding cache, a response hint is added. The higher level can send 'I keep/U keep' hints with its read requests. However, in the ease of a hit in the lower level cache, the lower level needs to inform the higher level that it overrided the hint, and thus passes a 'U keep' hint to the higher level. Further, in case the first level decides to disable the "smart" variation of the algorithm for sometime then it needs to pass that hint to the lower level as well. Thus, it is desirable to have the lower level as the deciding cache.

Figure 7:
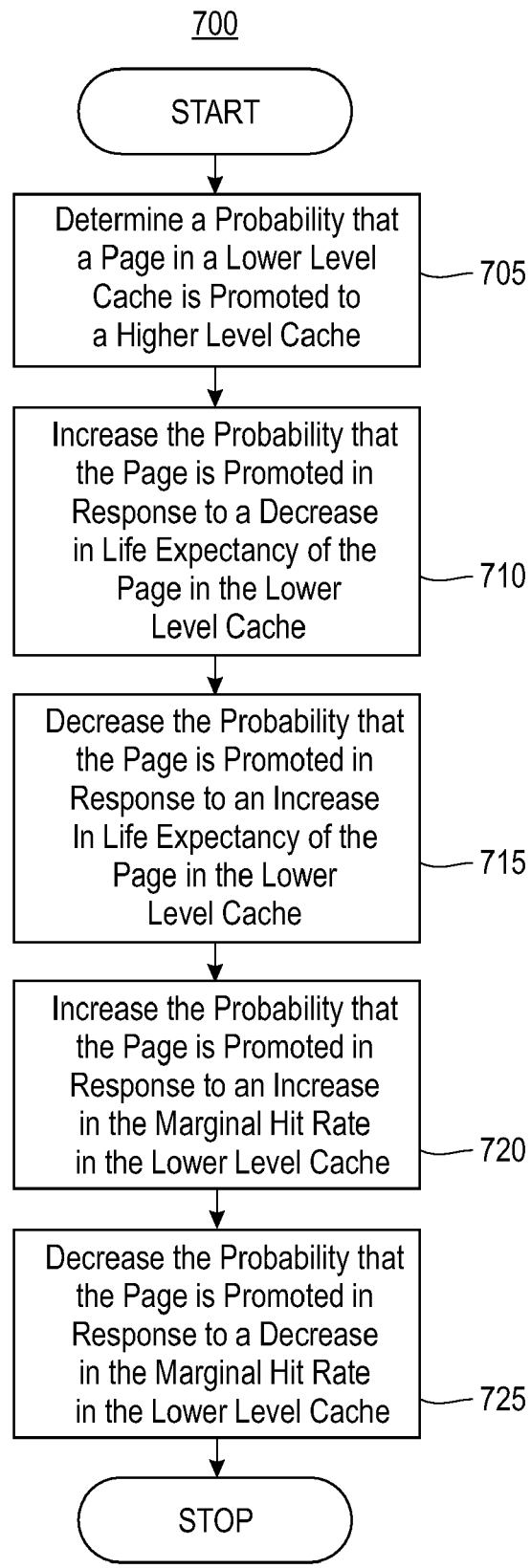
FIG. 7 illustrates a flow diagram of page promotion method within an exclusive multi-level caching environment in accordance with exemplary embodiments.

Once the management protocols are implemented in the environment, pages within the environment thus are promoted as pages are accessed. FIG. 7 illustrates a flow diagram of page promotion method 700 within an exclusive multi-level caching environment in accordance with exemplary embodiments. At step 705, a probability is determined that a page in a lower level cache is promoted to a higher-level cache. At step 710, the probability that a page is promoted is increased in response to a decrease in life expectancy of pages in the lower level cache. At step 715, the probability that a page is promoted is decreased in response to an increase in life expectancy of pages in the lower level cache. At step 720, the probability that a page is promoted is increased in response to an increase in the marginal hit rate in the lower level cache. At step 725, the probability that a page is promoted is decreased in response to a decrease in the marginal hit rate in the lower level cache.

The methods described herein ensure that a page that is repeatedly hit is promoted to higher level caches by being subjected repeatedly to a dynamically adjusted probability of being promoted to higher level caches, the adjustments being made based on hints such as the life hint and the marginal hit rate hint. As such, since an adjusted, probability exists at each cache in the multi-level hierarchy, a page with more and more hits migrates, or is promoted upwards in the hierarchy, thus ensuring that pages which are accessed most end up in the highest cache levels, while exclusivity is maintained.

As discussed above, the methods described herein can be applied to any combination of cache replacement algorithms on the first and second level. LRU has been described for illustrative purposes. The cache replacement policies at the two levels could be LFU, FBR, LRU-k, LFRU, MQ, ARC, etc. The multiple levels could have different replacement policies as well. In exemplary implementations, the deciding cache can send the 'I Keep' or 'U keep' hints irrespective of the replacement policy in the second level. A criterion like life or marginal hit rate is implemented to balance the multiple levels of cache.

The capabilities of the present invention can be implemented in software, firmware, hardware or some combination thereof.

As one example, one or more aspects of the present invention can be included, in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention, for instance, the steps may be performed in a differing order, or steps may be added, deleted or modified. All of these variations are considered a part of the claimed invention.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described, with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from, the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for multi-level exclusive caching, the method comprising:
    defining a cache management protocol within a multi-level cache hierarchy having a plurality of caches, including deciding caches and non-deciding caches;
    defining a hint protocol within the multi-level cache hierarchy; and
    implementing the hint protocol in conjunction with the cache management protocol to decide which pages within the multi-level cache to retain and where to store the pages,
    wherein the hint protocol includes an 'I keep' hint and an 'U keep' hint passed from the deciding caches to the non-deciding caches to determine, respectively, if the pages are retained in and sent from the deciding cache.

2. The method as claimed in claim 1 wherein hints are sent to a lower level cache with read requests when a higher-level cache is the deciding cache, and wherein hints are sent to an upper level cache with read responses when a lower level cache is the deciding cache.

3. The method as claimed in claim 1 further comprising promoting a page in a lower cache to a higher-level cache.

4. The method as claimed in claim 3 wherein the read response made in response to a read request includes a hint indicating that the higher-level cache keeps the page.

5. The method as claimed in claim 3 wherein the read response made in response to a read request includes a hint indicating that the lower level cache keeps the page.

6. The method as claimed in claim 3 further comprising periodically passing a life hint that determines at least one of the expectancy and the time duration that a page in one of the plurality of caches is retained in the cache before it is removed to make room for a new page.

7. The method as claimed in claim 6, wherein pages are promoted in response to the life hint.

8. The method as claimed in claim 3 further comprising periodically passing a marginal hit rate hint that determines the rate of hits of a page in one of the plurality of caches.

9. The method as claimed in 8 wherein pages are promoted with an increased marginal hit rate in the cache.

10. The method as claimed in claim 1 wherein a page in the lower cache is retained in the lower level cache.

11. A method for managing pages in a multi-level exclusive caching system, the method comprising:
   increasing promotion of pages a lower level cache to a higher level cache in response to at least one of a higher life expectancy of pages in the higher level cache, and an increased hit rate of pages in the lower level cache; and
   decreasing promotion of pages in the lower level cache to the higher level cache in response to at least one of a lower life expectancy of pages in the higher level cache, and a decreased hit rate of pages in the lower level cache.

12. A computer-readable medium for managing pages in a multi-level exclusive caching system, the computer-readable medium having computer-executable instructions for causing a computer to implement a method, comprising:
   increasing promotion of pages a lower level cache to a higher level cache in response to at least one of a higher life expectancy of pages in the higher level cache, and an increased hit rate of pages in the lower level cache; and
   decreasing promotion of pages in the lower level cache to the higher level cache in response to at least one of a lower life expectancy of pagers in the higher level cache, and a decreased hit rate of the pages in the lower level cache.

13. A system for multi-level exclusive caching, the system comprising:
   a lower level cache;
   a higher-level cache;
   an exclusive caching process for providing cache management of the lower and higher level caches, the process including instructions to:
   implement a cache management protocol within a multi-level cache hierarchy to determine the passage of pages between the caches, wherein the multi-level cache hierarchy includes deciding caches and non-deciding caches;
   implement a hint protocol within the multi-level cache hierarchy, wherein the hint protocol includes an 'I keep' hint and an 'U keep' hint passed from the deciding caches to the non-deciding caches to determine, respectively, if the pages are retained in and sent from the deciding cache;
   implement the hint protocol in conjunction with the cache management protocol to decide which pages within the multi-level cache to retain and where to store the pages; and
   promote pages in response to at least one of a decrease in a life expectancy of pages in the lower level cache, an increase in the life expectancy of the pages in the lower level cache, an increase in a marginal hit rate in the lower level cache, and a decrease in the marginal hit rate in the lower level cache.

\* \* \* \* \*